(12) United States Patent
Liu et al.

(10) Patent No.: US 10,640,707 B2
(45) Date of Patent: *May 5, 2020

(54) COMPOSITIONS COMPRISING ANISOTROPIC NANOPARTICLE LIQUID CRYSTAL DISPERSIONS HAVING TUNABLE OPTICAL PROPERTIES

(71) Applicant: THE REGENTS OF THE UNIVERSITY OF COLORADO, A BODY CORPORATE, Denver, CO (US)

(72) Inventors: Quingkun Liu, Boulder, CO (US); Ivan Smalyukh, Boulder, CO (US)

(73) Assignee: The Regents of the University of Colorado, a body corporate, Denver, CO (US)

(*) Notice: Subject to any disclaimer, the term of this patent is extended or adjusted under 35 U.S.C. 154(b) by 8 days.

This patent is subject to a terminal disclaimer.

(21) Appl. No.: 15/512,793

(22) PCT Filed: Sep. 22, 2015

(86) PCT No.: PCT/US2015/051435
§ 371 (c)(1),
(2) Date: Mar. 20, 2017

(87) PCT Pub. No.: WO2016/049017
PCT Pub. Date: Mar. 31, 2016

(65) Prior Publication Data
US 2017/0292073 A1  Oct. 12, 2017

Related U.S. Application Data

(60) Provisional application No. 62/054,747, filed on Sep. 24, 2014.

(51) Int. Cl.
  *C09K 19/22* (2006.01)
  *C09K 19/12* (2006.01)
  *C09K 19/30* (2006.01)
  *C09K 19/52* (2006.01)

(52) U.S. Cl.
  CPC ........ *C09K 19/22* (2013.01); *C09K 2019/122* (2013.01); *C09K 2019/3009* (2013.01); *C09K 2019/521* (2013.01)

(58) Field of Classification Search
  CPC ..................................................... C09K 1/00
  See application file for complete search history.

(56) References Cited

U.S. PATENT DOCUMENTS

| | | | | |
|---|---|---|---|---|
| 2005/0218377 A1* | 10/2005 | Lawandy | ............... | B82Y 30/00 252/299.01 |
| 2008/0311028 A1* | 12/2008 | Stanbery | ............... | B82Y 30/00 423/508 |
| 2010/0150513 A1* | 6/2010 | Zhang | ................... | B82Y 20/00 385/131 |
| 2010/0195008 A1* | 8/2010 | Hegmann | ............. | B82Y 20/00 349/33 |

(Continued)

*Primary Examiner* — Chanceity N Robinson
(74) *Attorney, Agent, or Firm* — Snell & Wilmer L.L.P.

(57) ABSTRACT

Disclosed herein are compositions, comprising one or more types of surface modified anisotropic nanoparticles dispersed in a liquid crystal. The compositions provide tunable methods for modifying light and energy flow.

16 Claims, 11 Drawing Sheets

(56) References Cited

U.S. PATENT DOCUMENTS

| | | | |
|---|---|---|---|
| 2011/0109854 A1* | 5/2011 | Tang | G02F 1/195 349/117 |
| 2013/0002999 A1* | 1/2013 | Kumai | G02B 5/3058 349/97 |
| 2016/0060529 A1* | 3/2016 | Hegmann | C09K 19/52 349/123 |

* cited by examiner

COMPOSITIONS COMPRISING ANISOTROPIC NANOPARTICLE LIQUID CRYSTAL DISPERSIONS HAVING TUNABLE OPTICAL PROPERTIES

CROSS REFERENCE TO RELATED APPLICATIONS

The present Application claims the benefit of priority to PCT/US2015/051435, filed Sep. 22, 2015, which is an International Patent Application which claims the benefit of priority to U.S. Provisional Application No. 62/054,747, filed on Sep. 24, 2014, which is incorporated herein by reference in its entirety.

FEDERALLY SPONSORED RESEARCH

This invention was made with Government support under Grant No. DMR0847782 awarded by the National Science Foundation. The Government has certain rights in the invention.

FIELD OF THE DISCLOSURE

Disclosed herein are compositions, comprising one or more types of surface modified anisotropic nanoparticles dispersed in a liquid crystal. The compositions provide tunable methods for modifying light and energy flow.

BRIEF DESCRIPTION OF THE FIGURES

FIG. 1A depicts nanorods dispersed in a liquid crystal wherein the long axis of the nanorods is aligned parallel to the far-field director N of the liquid crystal. FIG. 1B is the extinction spectra of aligned short (20×50 nm, thick solid and dashed lines) and long (14×88 nm, thin solid and dashed lines) gold nanorods in a nematic host for the director parallel and perpendicular to the polarizer P with the spectrum of pure liquid crystal 5CB (bottom thick line) shown for reference. FIG. 1C shows the polarization dependent extinction of short gold nanorods at longitudinal surface Plasmon resonance peak versus the angle between N and P.

FIG. 2A depicts the percent transmission versus applied voltage U. FIG. 2B represents the voltage-dependent extinction spectra for polarizer P along the rubbing direction. FIG. 2C is a graph of the rising time versus voltage obtained from a transmission versus time curve (inset) for the thickness of cell, d=18 µm and U=10 V. FIG. 2D is a graph of decay time versus cell thickness obtained from transmission versus time curves (inset) for d=18 µm. The fitting formulas are indicated in FIGS. 2C-D.

FIG. 3A is a schematic showing a gold nanorods with their long axes aligned perpendicular to director N. FIGS. 3B-C depict spectra obtained when dispersions are excited by light with different polarizations. FIG. 3B is the experimentally obtained extinction coefficient spectra obtained from a dispersion of 20 nm×63 nm gold nanorods in a liquid crystal wherein the polarized electromagnetic radiation is perpendicular (solid line) to director N and parallel (dashed line) to director N. FIG. 3C is the experimentally obtained extinction coefficient spectra obtained from a dispersion of 14 nm×88 nm gold nanorods in a liquid crystal wherein the polarized electromagnetic radiation is perpendicular (solid line) to director N and parallel (dashed line) to director N FIG. 4A shows the extinction spectra of dispersion of gold nanorods in liquid crystal as probed by linearly polarized incident light at different polarization directions with respect to the director, with and without the applied voltage (20 volts). FIG. 4B shows the extinction coefficient of gold nanorods in liquid crystal versus applied voltage. The arrow indicates the threshold voltage. FIG. 4C is a plot of the rising time versus applied voltages. FIG. 4D depicts a typical time response curve for the rising (thin line) and the decay (thick line) signal change corresponding to the realignment of the nanorods in liquid crystal.

FIG. 5A depicts a platelet with tangential boundary for liquid crystal molecules. FIG. 5B shows the polarized-light extinction spectra for 0 and 8 volts aligned parallel or tangential (see, legend) and unpolarized-light extinction spectra for vertical N and in an isotropic phase (bottom 2 dashed curves). FIG. 5C is a graph of rising time versus voltage and the corresponding theoretical fit. The inset shows a typical transmission versus voltage dependence.

FIG. 6A is a schematic depicting a triangular gold/silver nanoplatelets aligned perpendicular to the far-field director. FIGS. 6B-C depict spectra obtained wherein the liquid crystal is when dispersions are excited by light with different polarizations. FIG. 6B is the experimental extinction coefficient spectra of a first example of gold/silver nanoplatelets (13×50 nm) when the polarized electromagnetic radiation is perpendicular (solid line) and parallel (dashed line) to the director N. FIG. 6C is the experimental extinction coefficient spectra of another example of gold/silver nanoplatelets (13×60 nm) when the polarized electromagnetic radiation is perpendicular (solid line) and parallel (dashed line) to the director N.

FIG. 7A is a graph of the extinction spectra of a dispersion of gold/silver nanoplatelets in a liquid crystal excited by polarized light perpendicular and parallel to the director N, with and without the applied voltage as depicted in the legend. FIG. 7B represents the extinction coefficient of gold/silver nanoplatelets-liquid crystal composite versus applied voltage wherein the arrow indicates the threshold voltage. FIG. 7C is a plot of the rising time versus applied voltages. FIG. 7D depicts a typical time response curve for the rising (thin line) and the decay (thick line) signal change corresponding to the realignment of the gold/silver nanoplatelets in liquid crystal.

DETAILED DESCRIPTION

Figure 1A:
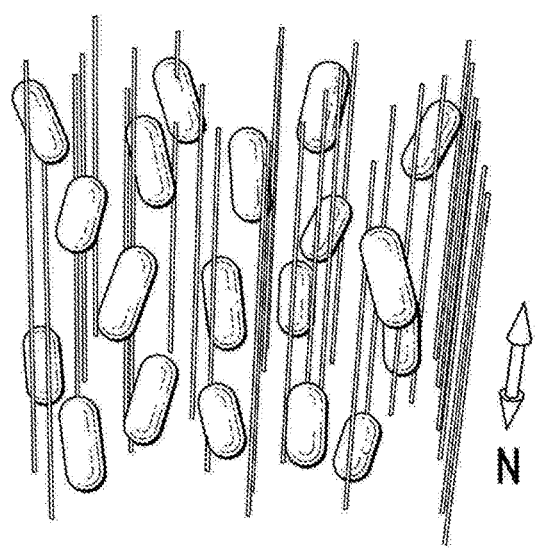
FIGS. 1A-C depict the properties of tangentially aligned gold nanorods in a nematic liquid crystals.
Figure 1B:
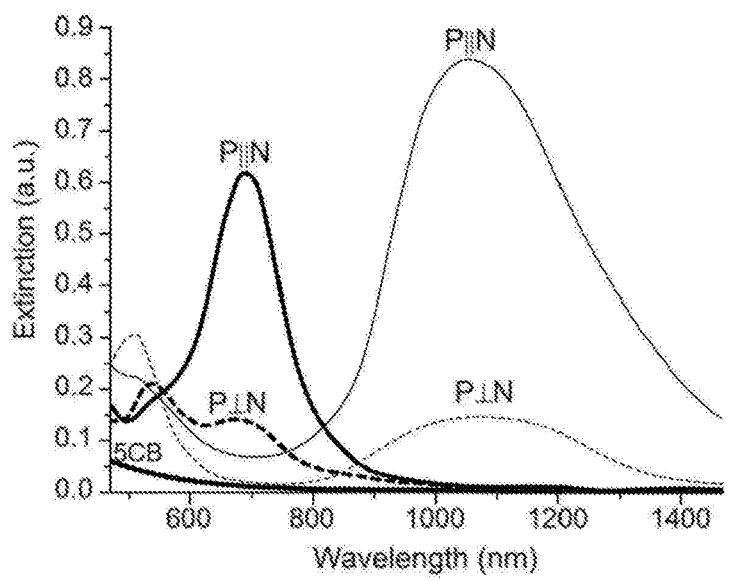
Figure 1C:
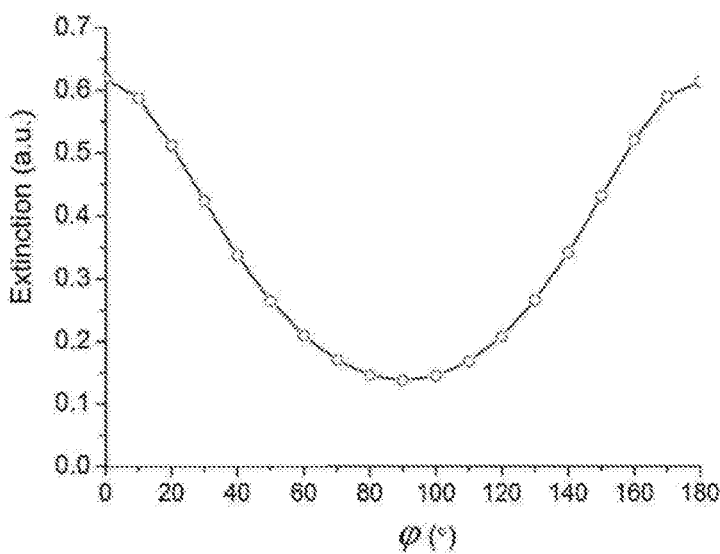
Figure 2A:
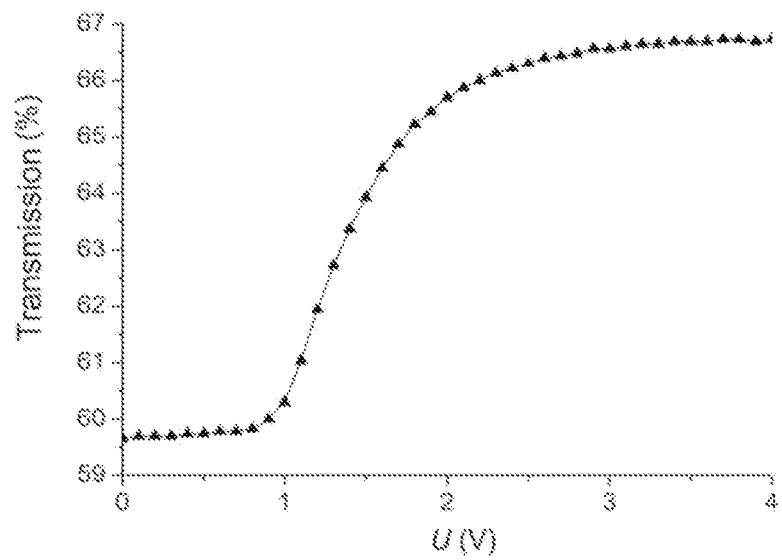
FIGS. 2A-D depict the properties of electric switching of liquid crystal with tangentially aligned gold nanorods.
Figure 2B:
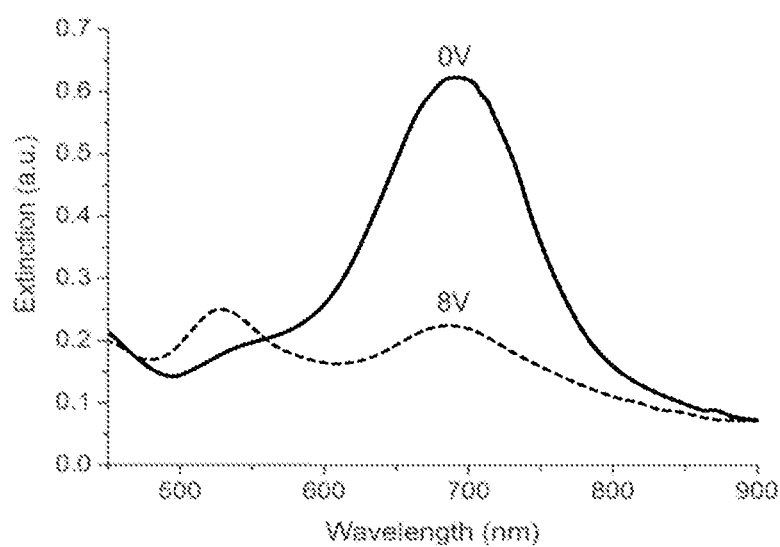
Figure 2C:
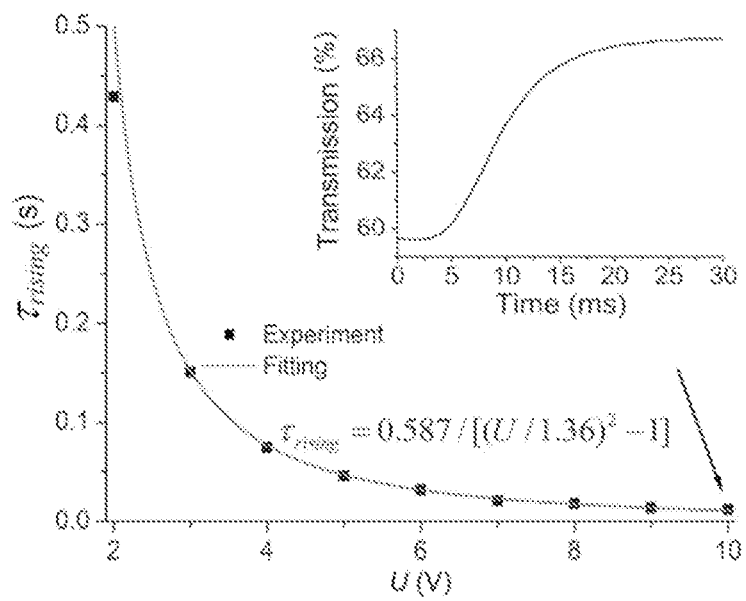
Figure 2D:
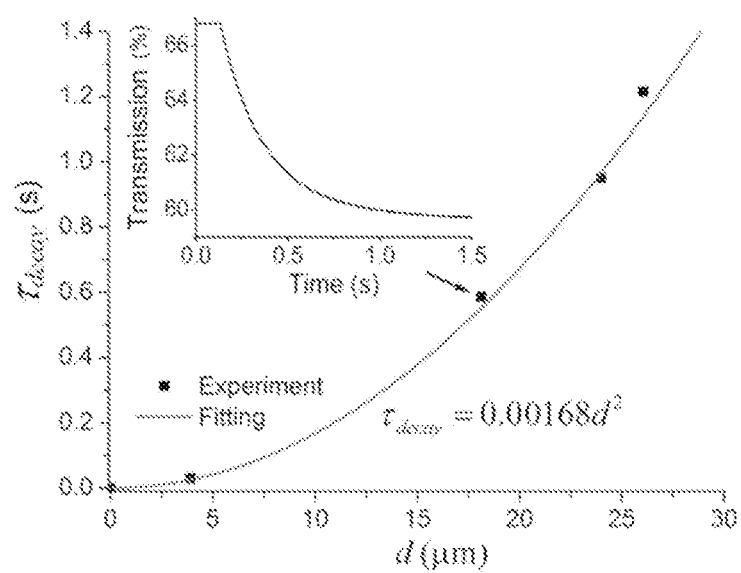

The materials, compounds, compositions, articles, and methods described herein may be understood more readily by reference to the following detailed description of specific aspects of the disclosed subject matter and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

All percentages, ratios and proportions herein are by weight, unless otherwise specified. All temperatures are in degrees Celsius (° C.) unless otherwise specified.

In this specification and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

It must be noted that, as used in the specification and the appended claims, the singular forms "a," "an" and "the" include plural referents unless the context clearly dictates otherwise. Thus, for example, reference to "a nanoparticle" includes mixtures of two or more such carriers, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein the term "liquid crystal" has the conventional meaning: a state of matter that has properties between those of a conventional liquid and those of solid crystal.

As defined herein a liquid crystal "director" describes the property in which liquid crystals align themselves in a single direction thereby providing an anisotropic system. The direction of the director, N, is defined as being local average orientation of mesogenic molecules.

The term "modified nanoparticle" or "functionalized nanoparticle" or "capped nanoparticle" refers to a disclose nanoparticle that is covered with a molecular layer of one or more organic compounds. The coating is not volatile to any great extent wherein the coating is not affected during processing, for example, removal of excess capping agent, as described herein below.

A "dispersion" as the term is used herein refers to a mixture of a plurality of disclosed nanoparticles and a nematic liquid crystal. A dispersion within the meaning herein is stable for a period of time, which can range from about one hour to years. Once utilized, for example, in a "smart window" the dispersion is stable for a period of time desired by the formulator. another term for a dispersion is a "suspension".

As defined herein the nanoparticles with surface treatment impose different alignment to liquid crystal molecules. When the local liquid crystal director is aligned parallel to the surface of nanoparticles, the nanoparticles are described herein as imposing parallel or tangential alignment to liquid crystal. For example, the rod-like nanoparticles with tangential alignment orient long the far-field director of liquid crystal, as depicted in FIG. 1A. When the local liquid crystal director is aligned perpendicular to the surface of nanoparticles, the nanoparticles are described herein as imposing homeotropic alignment of the liquid crystal. For example, the rod-like nanoparticles with homeotropic alignment orient perpendicular to the far-field director, as depicted in FIG. 3A.

Figure 3A:
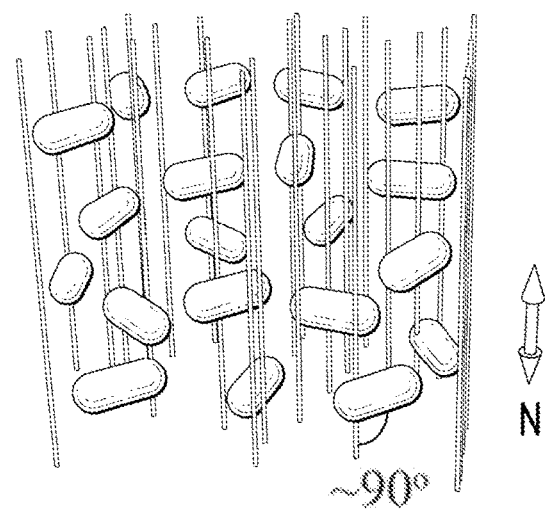
FIGS. 3A-C depict the properties of gold nanorods dispersed in a liquid crystal wherein the long axis of the gold nanorods is aligned perpendicular to the far-field director, N, of the liquid crystal.

The nanorods of FIG. 1A and FIG. 3A were surface modified by thiol-terminated methoxy-poly(ethylene glycol) (see, von Maltzahn et al., *Adv. Mater.* 2009, 21, 3175-3180). In each of the examples depicted, the nanorods are aligned parallel to the liquid crystal director, N.

Disclosed herein are compositions, comprising:

a) one or more functionalized anisotropic nanoparticles; and b) one or more liquid crystals.

What is meant herein by "functionalized" is that the surface of metal nanoparticles are modified by reaction with one or more organic reagents. The organic reagents provide a surface coating to the nanoparticle. These coatings which are familiar to the artisan provide compatibility between the nanoparticles and the liquid crystal matrix. The terms "modified" and "functionalized" are used interchangeably and relate to the fact that the disclosed nanoparticles have had their surfaces modified to provide one or more desirable properties can be used by the formulator to "tune" or otherwise modify the optical properties of the disclosed compositions.

For compositions comprising liquid crystals and nanoparticles dispersed therein, the following terms have been used. In the context of the disclosed compositions the term "guest-host" can be applied. The term "host" within this context refers to the liquid crystal, or in some embodiments, mixture of liquid crystals. The term "guest" applies to the disclosed modified or functionalized anisotropic nanoparticles. As such, the disclosed nanoparticles, as described herein, can be aligned by the host to produce contrasting light absorptive states in response to selectively activeable external stimuli, for example, electromagnetic radiation, an electrical field applied.

The disclosed nanoparticles can have any core shape or geometry provided the particles are anisotropic, i.e., have at least two axes that are dissimilar. Non-limiting examples of nanoparticle core shapes or geometry include rods, platelets, stars, spheres, irregular cubes, as well as other irregular morphologies.

The selection of nanoparticle geometry is determined by the user and the desired optical properties of the resulting composition. For example, nanorods have two principle extinction peaks. The observed wavelength of the respective peaks is the result of the surface plasmon resonance (SPR) exhibited along each axis. For example, one extinction peak occurs at short wave lengths and is due to adsorption and scattering of electromagnetic radiation along the short axis of the nanorod. The second peak corresponds to the adsorption and scattering of electromagnetic radiation along the long axis of the nanorods.

Similarly, nanoplatelets have two principle SPR extinction peaks. The first extinction peak occurs at short wave lengths and is due to adsorption and scattering of electromagnetic radiation along the out-of-plane direction. The second peak corresponds to the adsorption and scattering of electromagnetic radiation along the in-plane direction.

The strength of the extinction and the wavelength of the extinction will also vary depending upon the composition of the core nanoparticle, for example, gold, silver, platinum, zinc, copper and the like. As described herein above, the compositions can be "tuned" to provide the desired optical properties desired by the formulator. The following are non-limiting examples of variables that can be adjusted by the formulator:

i) choice of nanoparticle geometry;
 ii) choice of nanoparticle elemental composition;
 iii) size of the nanoparticle;
 iv) choice of nanoparticle surface modifier;
 v) choice of liquid crystal matrix;
 vi) relative concentration of nanoparticles; and
 vii) external field stimulus, for example, electric field or light.

As described herein the various choices will affect the optical properties of the final compositions. For example, the selection of nanoparticle geometry and size can determine the peak extinction wavelength of the composition. In addition, whether the nanoparticles are aligned parallel or perpendicular to the liquid crystal director is dependent upon selection of the surface modifying agent. In addition, the applied voltage or wavelength of light directed upon the composition allows the formulator to control the optical properties of the resulting compositions when in use.

Figure 3B:
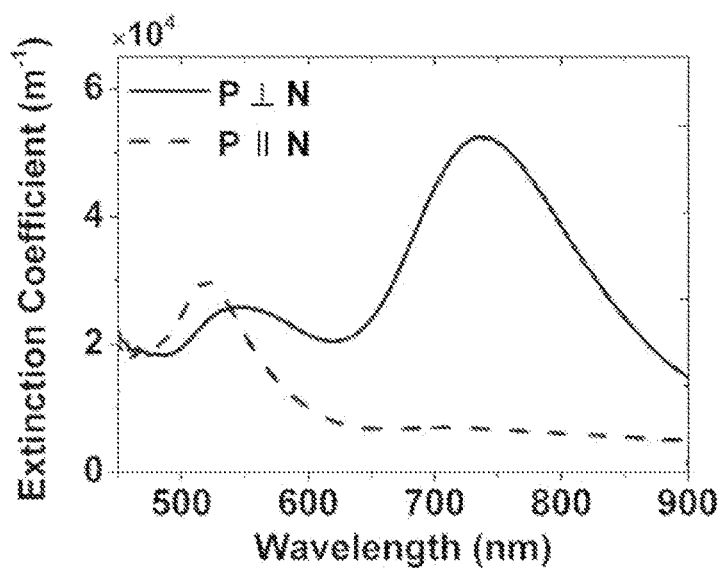
Figure 3C:
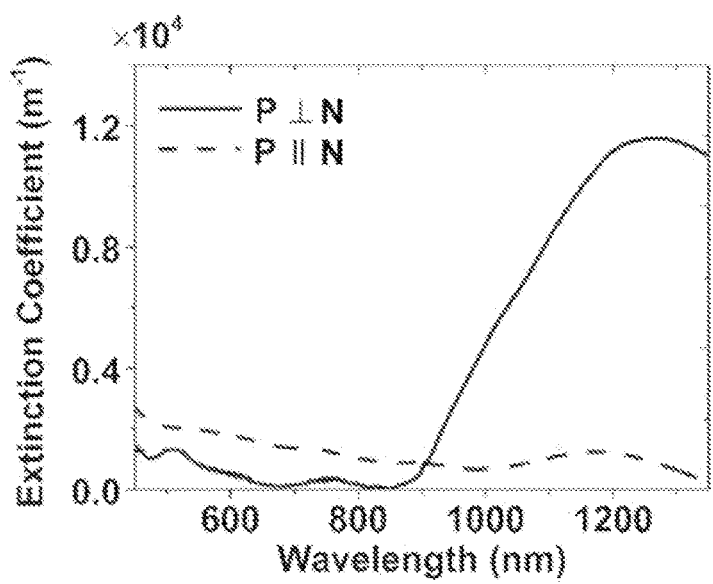

FIG. 3A depicts a dispersion of gold nanorods aligned perpendicular perpendicular to the far-field director, N, of the liquid crystal. FIG. 3B shows the experimentally obtained extinction coefficient spectra of a 20 nm×63 nm gold nanorods dispersion aligned according to FIG. 3A. Polarized electromagnetic radiation applied perpendicular to director N produces the spectrum with the solid line in FIG. 3B. Polarized electromagnetic radiation applied parallel to director N produces the spectrum with the dashed line in FIG. 3B. FIG. 3C shows the experimentally obtained extinction coefficient spectra of a 14 nm×88 nm gold nanorods dispersion aligned according to FIG. 3A. Polarized electromagnetic radiation applied perpendicular to director N produces the spectrum with the solid line in FIG. 3C. Polarized electromagnetic radiation applied parallel to director N produces the spectrum with the dashed line in FIG. 3C.

As can be seen when comparing the spectra of FIGS. 3B and 3C, the size of the nanorods affects the value of the extension coefficient and its maximum value. As such, selection of the particle's size allows the formulator to fine tune the optical properties of the disclosed compositions.

One aspect of the present disclosure relates to compositions comprising two or more anisotropic nanoparticles. For example, a co-dispersion of plasmonic nanoparticles with different anisotropic shapes, sizes, aspect ratios or surface alignment in a liquid crystal can lead to strong long-range polarization-sensitive SPR effects. This provides a means for selectively controlling the degree of absorption and scattering of incident electromagnetic radiation at various regions of the electromagnetic spectrum. In use, a composition can therefore be tuned to selectively control the amount of visible light that is transmitted through a glass panel while restricting the passage of near infrared radiation.

In addition to alignment parallel or perpendicular to the liquid crystal director, the disclosed anisotropic nanoparticles can be aligned at any angle desired by the formulator. This provides the formulator with another variable which allows for the fine tuning of the resulting optical properties.

Figure 4A:
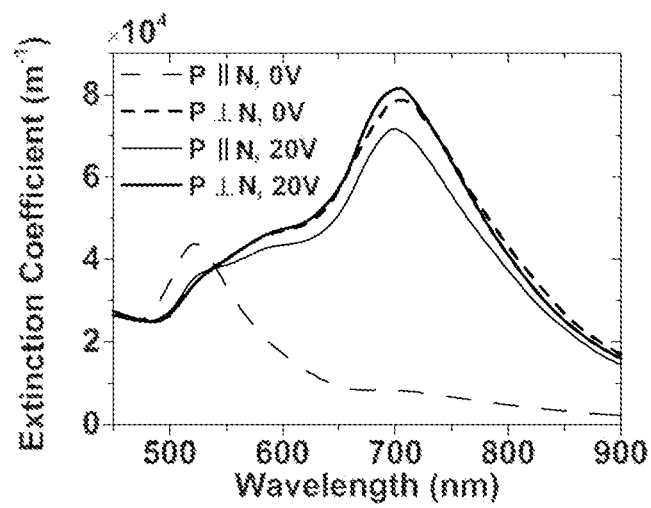
FIGS. 4A-D depict electric switching of liquid crystal with homeotropically aligned gold nanorods.

FIGS. 4A-D depict the electric switching of liquid crystals with homeotropically aligned gold nanorods. FIG. 4A shows the extinction spectra of a dispersion of gold nanorods in a liquid crystal as probed by linearly polarized incident light. Polarized light parallel to director N wherein 20 volts is applied to the composition is represented by the thin solid line in FIG. 4A. Polarized light perpendicular to director N wherein 20 volts is applied to the composition is represented by the thicker solid line in FIG. 4A. Comparing the two spectra, the dispersions wherein the polarized light is parallel or perpendicular to the liquid crystal director under a 20 volt bias, have essentially the same wavelength for the coefficient maximum, but the coefficient for the perpendicular light is slightly higher.

Polarized light parallel to director N wherein no voltage is applied to the composition is represented by the thin dashed line in FIG. 4A. Polarized light perpendicular to director N wherein no voltage is applied to the composition is represented by the thicker dashed line in FIG. 4A. As can be seen in FIG. 4A when the electromagnetic radiation is applied perpendicular to the liquid crystal director, an applied voltage produces a spectrum having almost identical emission as a composition without electrical bias. Compositions having no electrical bias produce drastically different emission spectra when the direction of polarized light is changed.

Figure 4B:
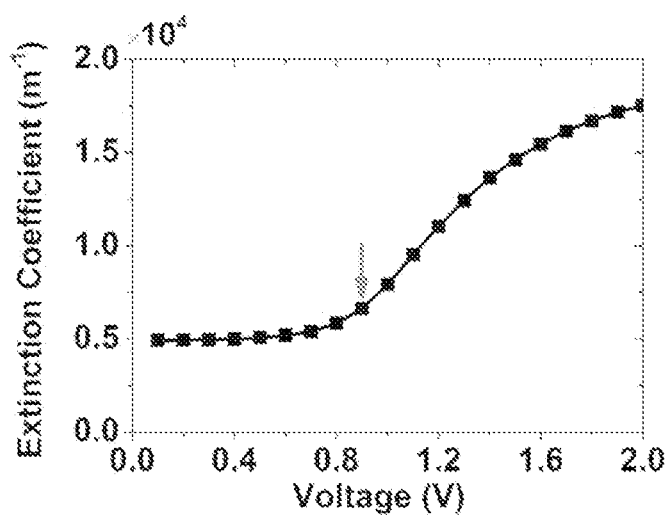
Figure 4C:
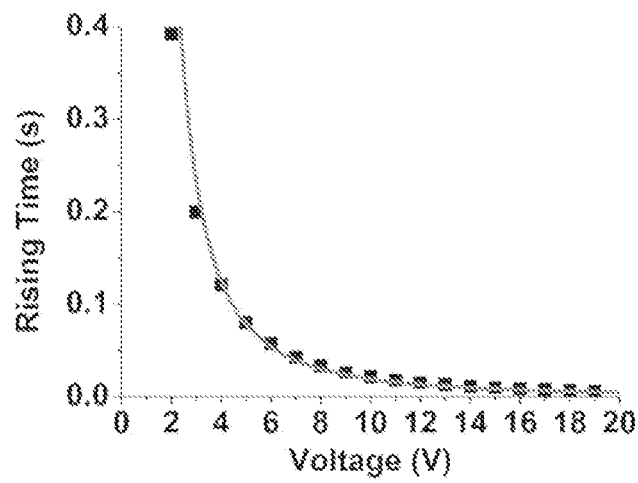
Figure 4D:
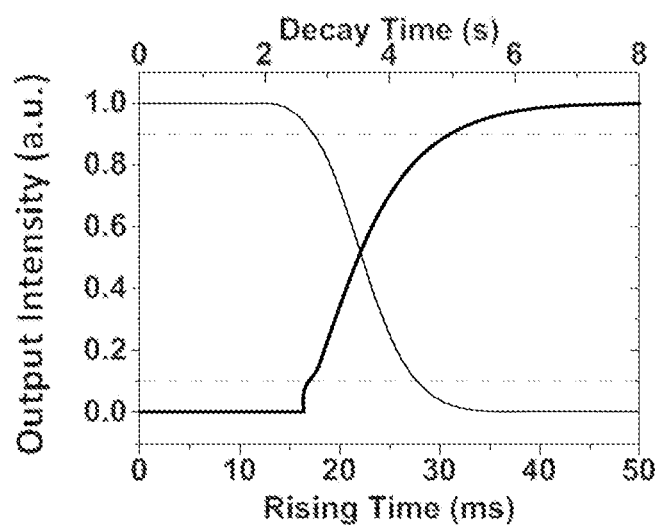

FIG. 4B shows the extinction coefficient of gold nanorods in liquid crystal versus applied voltage. The arrow indicates the threshold voltage. FIG. 4C is a plot of the rising time versus applied voltages. FIG. 4D depicts a typical time response curve for the rising (thin line) and the decay (thick line) signal change corresponding to the realignment of the nanorods in liquid crystal.

Figure 5A:
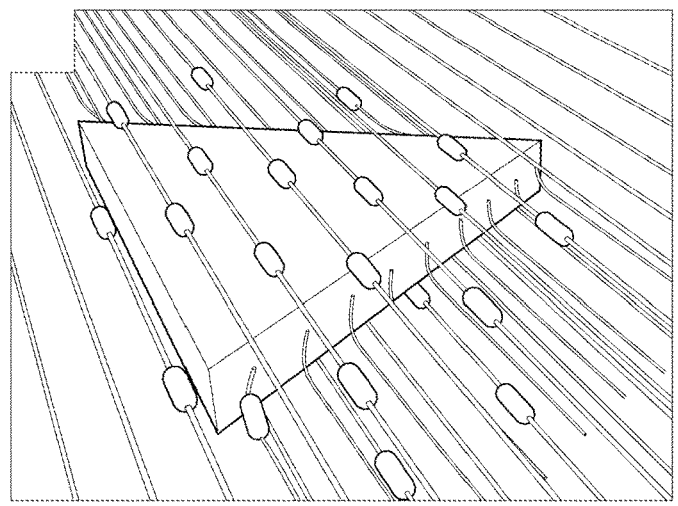
FIGS. 5A-C depict the properties of gold/silver nanoplatelet alignment in nematic liquid crystals.
Figure 5B:
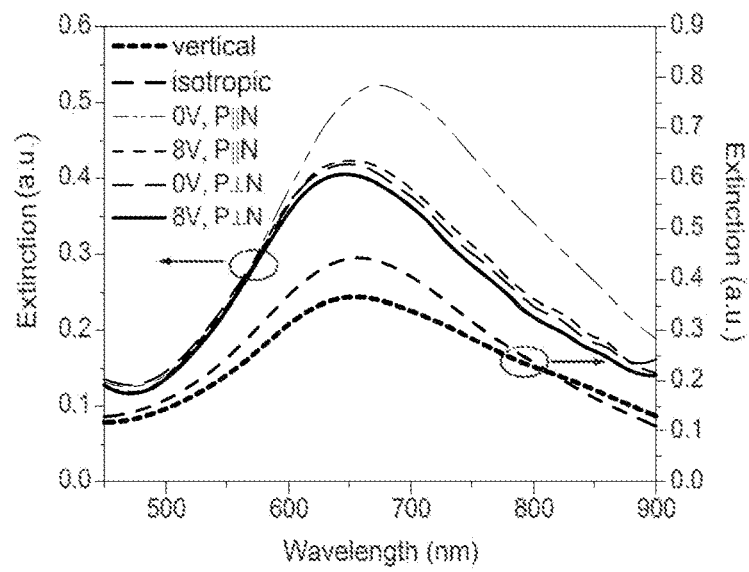
Figure 5C:
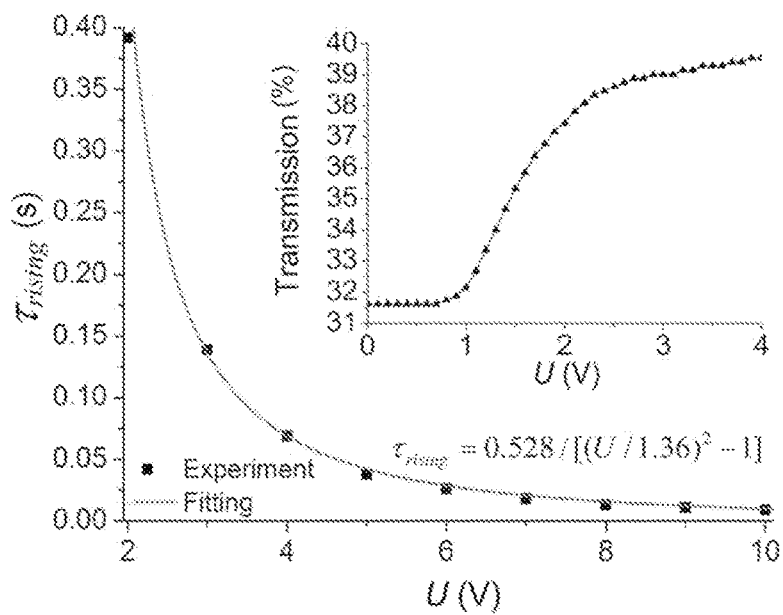

FIG. 5A depicts a platelet with tangential boundary in nematic liquid crystal molecules. FIG. 5B shows the polarized-light extinction spectra variously aligned platelets with or without an applied voltage. When no voltage is applied to the dispersion and the polarized light is applied parallel to the liquid crystal director N, the spectrum with the alternating long dash/2 short dashed line results as shown in FIG. 5B. When electromagnetic radiation is applied with an 8 volt bias, both parallel and perpendicular to the director or when applied perpendicular with no voltage, the resulting spectra are essentially coincidental on one another as seen in FIG. 5B. FIG. 5C is a graph of rising time versus voltage and the corresponding theoretical fit. The inset shows a typical transmission versus voltage dependence.

Figure 6A:
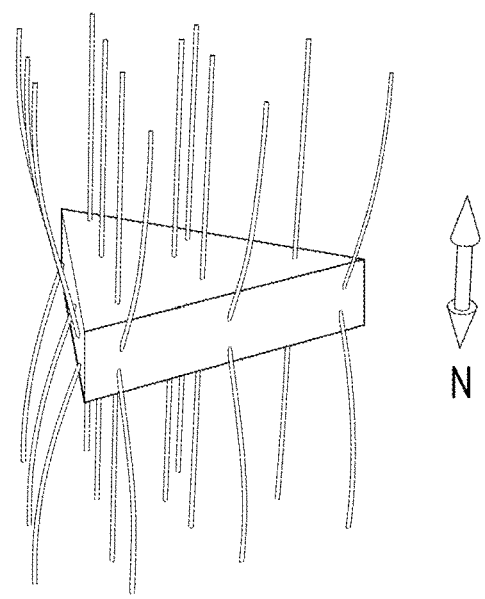
FIGS. 6A-C depict the properties of homeotropically aligned gold/silver nanoplatelets in a nematic liquid crystal.
Figure 6B:
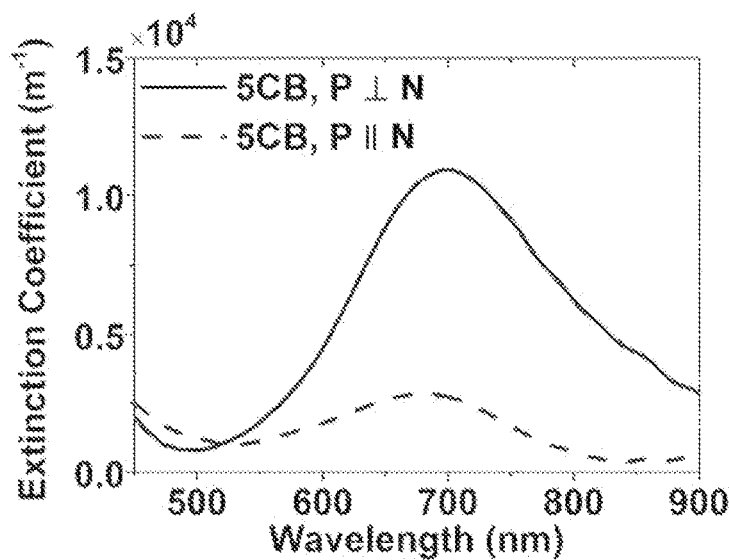
Figure 6C:
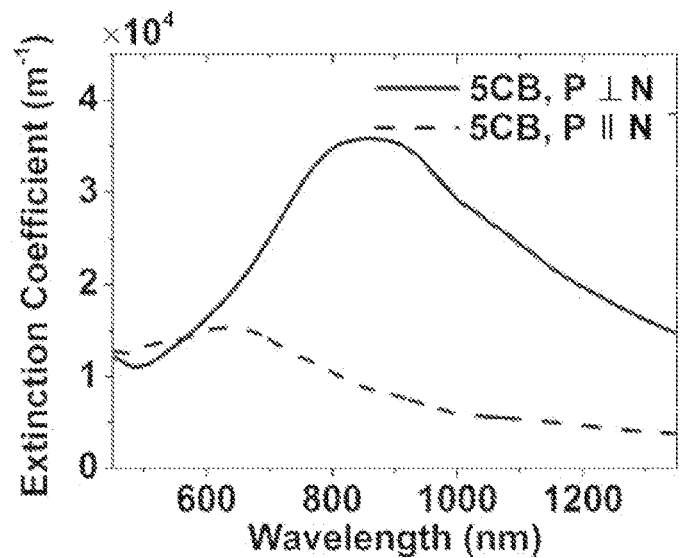

FIG. 6A is a schematic depicting a triangular gold/silver nanoplatelets dispersed in liquid crystal and aligned perpendicular to the far-field director. FIG. 6B is the experimentally obtained extinction emission spectra of a first example of gold/silver nanoplatelets (13×50 nm) when the polarized electromagnetic radiation is perpendicular (solid line) and parallel (dashed line) to the director N. FIG. 6C is the experimental extinction coefficient spectra of another example of gold/silver nanoplatelets (13×60 nm) when the polarized electromagnetic radiation is perpendicular (solid line) and parallel (dashed line) to the director N.

FIGS. 7A-D depict the electric switching of spectra of dispersions with homeotropically aligned gold/silver nanoplatelets in a nematic liquid crystal. These results are similar to those depicted in FIG. 4A-D.

Figure 7A:
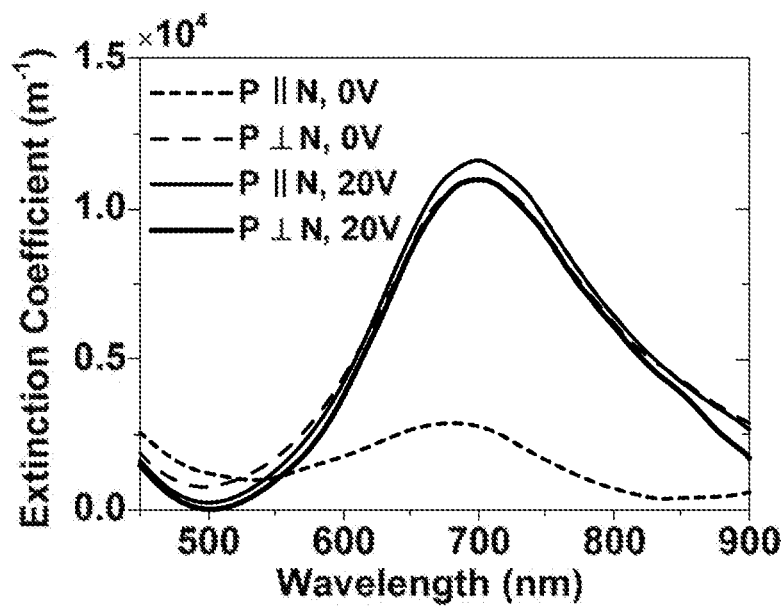
FIGS. 7A-D depict the electric switching of spectra of dispersions with homeotropically aligned gold/silver nanoplatelets in a nematic liquid crystal.

Polarized light parallel to director N wherein no voltage is applied to the composition is represented by the closely dashed line in FIG. 7A. Polarized light perpendicular to director N wherein no voltage is applied to the composition is represented by the further spaced dashed line in FIG. 7A. As can be seen in FIG. 7A there is a dramatic difference when the direction of polarized light is applied to the composition when no electrical bias is present. When a 20 volt electrical bias is applied, polarized light applied both parallel and perpendicular to N produce essentially the same emission spectra as perpendicularly applied radiation with no voltage.

Figure 7B:
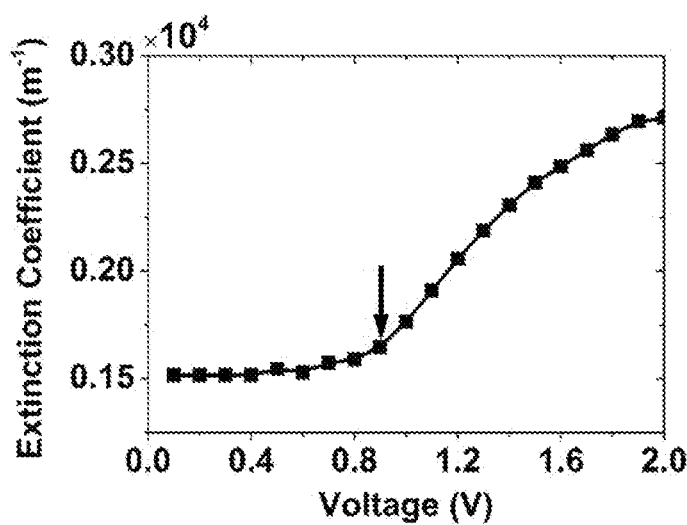
Figure 7C:
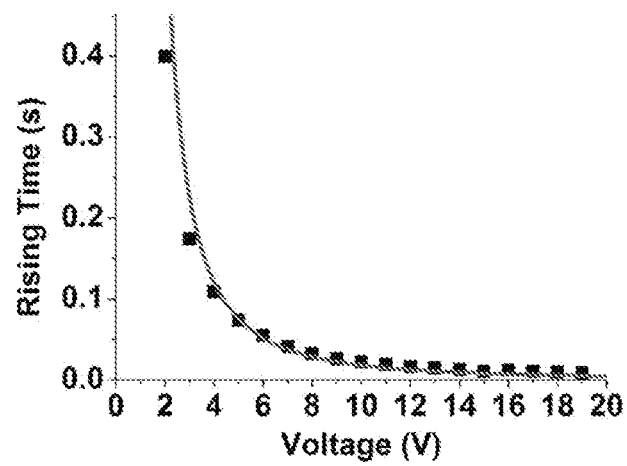
Figure 7D:
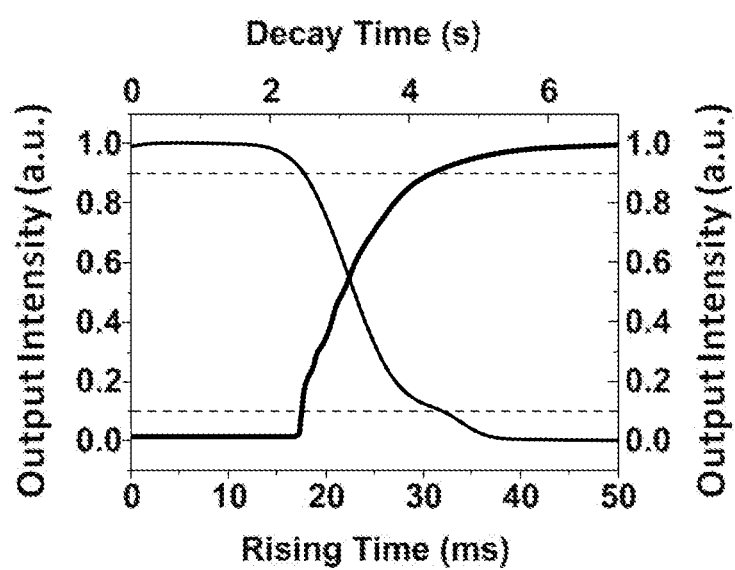
Figure 8:
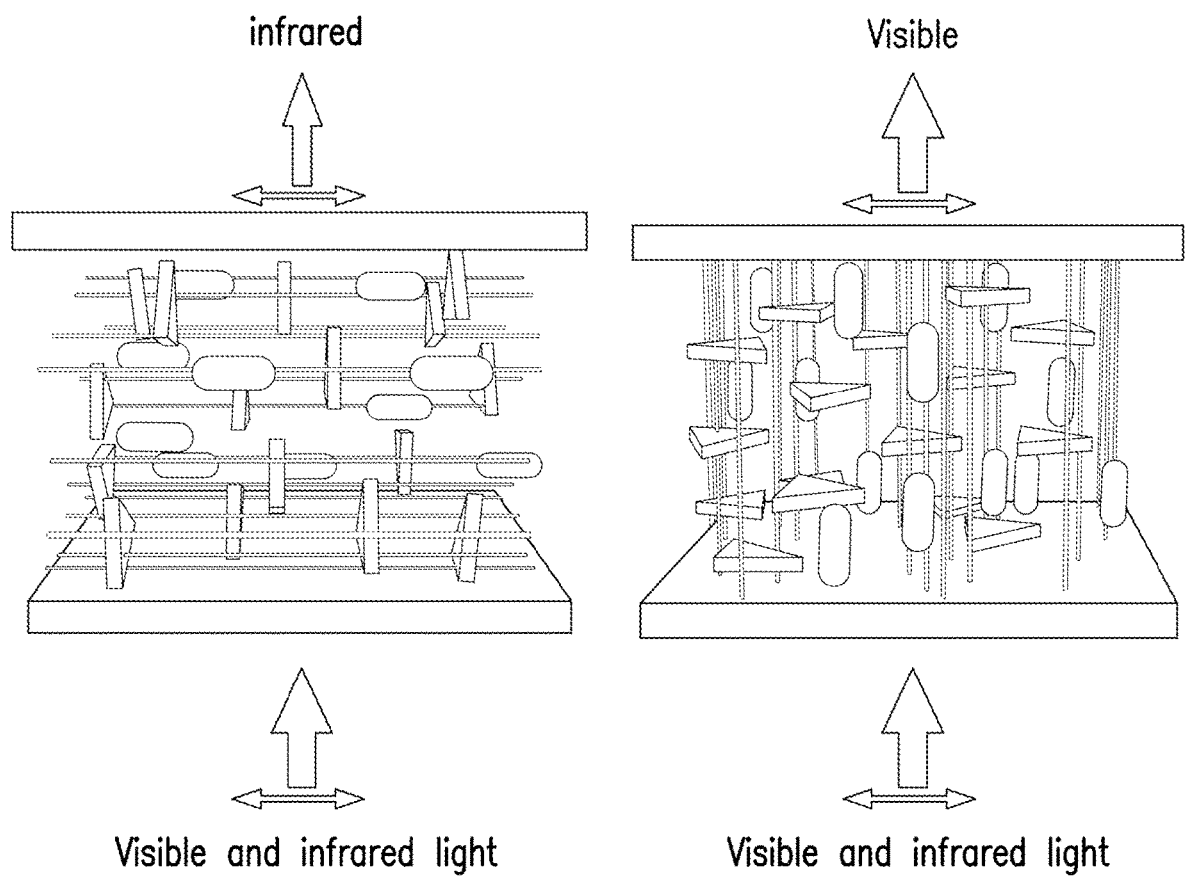
FIG. 8 depicts co-dispersion of homeotropically aligned nanoplatelets (left) and tangentially aligned nanorods (right) in a liquid crystal, which control the transmission of visible and inferred light by voltage.

FIG. 7B represents the extinction coefficient of gold/silver nanoplatelets-liquid crystal composite versus applied voltage wherein the arrow indicates the threshold voltage. FIG. 7C is a plot of the rising time versus applied voltages. FIG. 7D depicts a typical time response curve for the rising (thin line) and the decay (thick line) signal change corresponding to the realignment of the gold/silver nanoplatelets in liquid crystal. FIG. 8 depicts co-dispersion of homeotropically aligned nanoplatelets and tangentially aligned nanorods in a liquid crystal, wherein the alignment controls the transmission of visible and infrared light by voltage.

Nanoparticles

The disclosed nanoparticles can comprise any metal which can be utilized to provide the desired optical properties of the solution in use. Non-limiting examples of metals includes gold, silver, platinum and copper. In one embodiment the nanoparticles comprise gold. In another embodiment the nanoparticles comprise silver. In a further embodiment the nanoparticles comprise platinum. In a still further embodiment the nanoparticles comprise copper. In one iteration the disclosed compositions can comprise a mixture of two different metal nanoparticles, for example, gold and silver.

As stated herein above, a disclosed nanoparticle can have a variety of shapes and cross-sectional geometries that may depend, in part, upon the process used to produce the particles. In one embodiment, a disclosed nanoparticle can have a shape that is a rod, a tube, a flake, a fiber, a plate, a wire, a cube, or a whisker. A disclosed nanoparticle can include particles having two or more of the aforementioned shapes. In one embodiment, a cross-sectional geometry of the particle can be one or more of circular, ellipsoidal, triangular, rectangular, or polygonal, provided the nanoparticle is anisotropic. In one embodiment, a disclosed nanoparticle can comprise particles in the form of ellipsoids, which may have all three principal axes of differing lengths, or may be oblate or prelate ellipsoids of revolution. Another example of disclosed nanoparticles are laminar in form, wherein laminar refers to particles in which the maximum dimension along one axis is substantially less than the maximum dimension along each of the other two axes. The disclosed nanoparticles can also have the shape of frusta of pyramids or cones, or of elongated rods. In one embodiment, the nanoparticles can be irregular in shape.

As described herein earlier, a nanoparticle can refer to a single particle or a plurality of particles, and the particles having an average particle size on the nano scale. The nanoparticles may be characterized by one or more of average particle size, particle size distribution, average particle surface area, particle shape(s), or particle cross-sectional geometry.

The disclosed nanoparticles can have any geometry or shape desired by the formulator to provide the desired optical properties and orientation with respect to the director of the liquid crystal. In one aspect the nanoparticles are nanorods. The disclosed nanorods can have a length of from about 10 nm to about 1,000 nm. In one embodiment the nanorods can have a length of from about 10 nm to about 200 nm. In another embodiment the nanorods can have a length of from about 10 nm to about 100 nm. In a further embodiment the nanorods can have a length of from about 20 nm to about 100 nm. In a yet further embodiment the nanorods can have a length of from about 50 nm to about 200 nm. In a still further embodiment the nanorods can have a length of from about 30 nm to about 70 nm. In a yet another embodiment the nanorods can have a length of from about 100 nm to about 250 nm. In a still another embodiment the nanorods can have a length of from about 50 nm to about 100 nm. The disclosed nanorods have a ratio of length to diameter of from about 1.5:1 to about 20:1.

In one non-limiting example, the nanorods comprise gold.

In another aspect the nanoparticles are triangular nanoplatelets. The disclosed nanoplatelets can have a mean lateral size of from 10 nm to 1000 nm. In one embodiment the nanoplatelets can have a mean lateral size of from about 10 nm to about 20 nm. In another embodiment the nanoplatelets can have a mean lateral size of from about 10 nm to about 50 nm. In a further embodiment the nanoplatelets can have a mean lateral size of from about 5 nm to about 20 nm. In a yet further embodiment the nanoplatelets can have a mean lateral size of from about 15 nm to about 50 nm. In a still further embodiment the nanoplatelets can have a mean lateral size of from about 30 nm to about 70 nm. In a yet another embodiment the nanoplatelets can have a mean lateral size of from about 10 nm to about 25 nm. In a still another embodiment the nanoplatelets can have a mean lateral size of from about 5 nm to about 50 nm.

The disclosed nanoplatelets can have a thickness of from 5 nm to 50 nm. In one embodiment the nanoplatelets can have a thickness of from about 5 nm to about 20 nm. In another embodiment the nanoplatelets can have a thickness of from about 5 nm to about 20 nm. In a further embodiment the nanoplatelets can have a thickness of from about 10 nm to about 20 nm. In a yet further embodiment the nanoplatelets can have a thickness of from about 15 nm to about 30 nm. In a still further embodiment the nanoplatelets can have a thickness of from about 10 nm to about 15 nm. In a yet another embodiment the nanoplatelets can have a thickness of from about 25 nm to about 35 nm. In a still another embodiment the nanoplatelets can have a thickness of from about 1 nm to about 10 nm. The disclosed nanoplatelets can have an aspect ratio of from about 1.5:1 to about 20:1

In one non-limiting example, the nanoplatelets comprise gold.

The disclosed nanoparticles can have any geometry or configuration chosen by the formulator in order to achieve the desired resulting optical properties.

In one embodiment, the disclosed nanoparticle can include a plurality of particles having a particle size distribution that is a normal distribution, unimodal distribution, a bimodal distribution, or a multi-modal distribution. Certain particle size distributions are useful to provide certain optical properties, and other ranges of particle size distributions are useful to provide different benefits (for instance, electrical conductivity may require a different particle size range than the other properties). A normal distribution refers to a distribution of particle sizes with wherein the sizes are within 5% of the median size. A unimodal distribution may refer to a distribution of particle sizes having the same particle size. In another embodiment, the disclosed nanoparticles can have two distinct size ranges (a bimodal distribution) included in the composition, for example, the first range from 10 nanometer to about 15 nanometers, and the second range from about 25 nanometers to about 50 nanometers.

Surface Modifiers

Disclosed herein are nanoparticle surface modifiers. The surface modifiers allow the nanoparticles to orient with respect to the liquid crystal director in a manner that can affect the optical properties of the compositions. By selection of a modifier, the nanoparticles can be directed to align either parallel to the liquid crystal director or perpendicular to the director.

Nanoparticles which are functionalized with thiol-terminated methoxy-poly(ethylene glycol) align parallel or tangentially to the liquid crystal director. Nanoparticles functionalized with dimethyloctadecyl [3-(trimethoxysilyl) propyl] ammonium chloride (DMOAP), lecithin, cetyltrimethylammonium bromide (CTAB), and other ligands with long hydrocarbon chains align perpendicular or homeotropic to the liquid crystal director.

Liquid Crystals

The disclosed compositions can comprise any liquid crystal in the nematic phase that will stabilize the alignment of the nanoparticles into a geometric alignment desired by the formulator to provide enhanced optical anisotropy. Non-limiting examples of nematic liquid crystals include: 1-(trans-4-hexylcyclohexyl)-4-isothiocyanatobenzene; 4'-(hexyloxy)-4-biphenylcarbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile; 4,4'-azoxyanisole; 4-isothiocyanatophenyl 4-pentylbicyclo[2.2.2]octane-1-carboxylate; 4-(trans-4-pentylcyclohexyl)benzonitrile; 4-methoxycinnamic acid; N-(4-ethoxybenzylidene)-4-butylaniline; and N-(4-methoxybenzylidene)-4-butylaniline.

Compositions in Use

As indicated herein, the disclosed nanoparticles can be aligned at any angle relative to the director of the liquid crystal host. Depending upon the alignment (tangential, homeotropic or at an angle between parallel and perpendicular) the extinction of the nanoparticles will vary. In addition, the extinction will vary depending upon the amount of voltage applied across the disclosed compositions.

The disclosed compositions can be applied as a layer between two optically transparent layers, for example, glass, quartz, plastic and the like. The layers can have a thickness suitable to hold the system self-rigid or the system can be framed by non-optically transparent material. A window such as those used in houses and buildings is a typical configuration.

In one non-limiting embodiment, a window having a height of 48 inches and a width of 32 inches is prepared as follows. To a first glass panel is applied a composition according to the present disclosure. A second glass panel is positioned on top of the composition layer and the ends are sealed in a manner such that an electrical current can pass from one end of the panel to the other, the current being conducted through the disclosed composition. Upon exposure to sunlight when no current passes through the window, sunlight light of a first measurable wavelength range passes through the window. Upon application of a voltage across the composition, a second measurable wavelength range passes through the window.

Procedures

It is necessary to provide a complete dispersion of the nanoparticles within the liquid crystal matrix in order to obtain the desired alignment with respect to the director N, for example, tangential, homeotropic or tilted. The dispersion and ordering of alignment is affected by the particular surface modification. In general, after functionalization the nanoparticles are dispersed into an organic solvent via centrifugation and repeated washing. The nanoparticle/liquid crystal dispersion is achieved either by adding a thermotropic liquid crystal to fully dried nanoparticles or full evaporation of the solvent from the nanoparticle/liquid crystal/solvent mixture.

When forming the compositions, the admixture of nanoparticle and liquid crystal can be sonicated to above the clearing point of the selected liquid crystal, thereby providing a homogeneous dispersion in the liquid crystal isotropic phase. The dispersion is then vigorously stirred while cooling the solution down to the nematic phase. This procedure avoids aggregation caused by isotropic-nematic front propagation and nucleation of nematic domains within the isotropic melt and is provides a stable colloidal dispersion. The composites are then centrifuged at low speed to remove residual aggregates providing a final liquid crystal dispersion comprising only individual nanoparticles in the liquid crystal matrix.

Example 1

Nanorods Aligned Parallel to Liquid Crystal Director

A surface modifier that directs gold nanorods to align in parallel to the liquid crystal director is applied to gold nanorods. 1 mL of an aqueous solution comprising 30 mg of thiol-terminated methoxy-poly(ethylene glycol) (mPEG-SH) was added to 50 mL of a diluted gold nanorod aqueous dispersion with optical density of 4. After standing for 24 hours the dispersion is centrifuged and the supernatant decanted to remove excess mPEG-SH. The surface capping procedure is repeated twice to fully coat gold nanorod surfaces with mPEG. The surface modified gold nanorods were dispersed in methanol, centrifuged at 9000 rpm for 20 minutes, then washed with additional methanol three times. The solvent from 50 μL of gold nanorods dispersion was fully evaporated by heating to 90° C. 15 μL of a nematic 4-cyano-4'-pentylbiphenyl (5CB) was then added and the mixture sonicated at 40° C. for 5 minutes then cooled to below the clearing point of the liquid crystal with vigorous stirring. The resulting dispersion is centrifuged at 3000 rpm for 5 minutes to remove any residual aggregates. Multigram-scale preparation of gold nanorods-liquid crystal composites are easily reproduced in this modified synthetic method.

The resulting composition was then injected into a planar liquid crystal cell. The liquid crystal cells were fabricated from glass plates coated with transparent indium tin oxide electrodes and polyimide alignment layer on their inner surfaces, which were rubbed to impose boundary conditions for liquid crystal director and glued together with UV-curable glue containing silica spacers to define the desired cell gap. When the polarization of incident light is parallel to the liquid crystal director while no electric field is applied, the longitudinal SPR mode is excited thus the compositions show strong extinction in the vicinity of the longitudinal SPR peak of gold nanorods. When the polarization of incident light is perpendicular to the liquid crystal director or an electric field is applied to the liquid crystal cell, the transverse SPR mode is excited thus compositions show very weak extinction in the vicinity of the longitudinal SPR peak of gold nanorods.

Example 2

Nanorods Aligned Perpendicular to Liquid Crystal Director

A surface modifier that directs gold nanorods to align perpendicular to the liquid crystal director is applied to gold nanorods. 0.3 µL of (3-Mercaptopropyl) trimethoxysilane (MPTMS) was dissolved in 100 µL ethanol and added to 5 mL of an aqueous solution of gold nanorods with an optical density of 0.4. After 30 minutes the solution is centrifuged at 7000 rpm for 10 minutes and the supernatant decanted. The resulting solid re-dispersed in 10 mL of distilled water. 200 µL of 40 wt % dimethyloctadecyl [3-(trimethoxysilyl)propyl] ammonium chloride (DMOAP) in methanol is added to gold nanorods solution and the solution allowed to stand for 20 minutes. The solution is then centrifuged at 7000 rpm for 10 minutes, the supernatant decanted and the residue washed with methanol. 15 µL of a nematic 5CB was then added and the solvent from gold nanorods dispersion in 5CB was fully evaporated by heating to 90° C. The mixture was sonicated at 40° C. for 5 minutes then cooled to below the clearing point of the liquid crystal with vigorous stirring. The resulting dispersion is centrifuged at 3000 rpm for 5 minutes to remove any residual aggregates. Multigram-scale preparation of gold nanorods-liquid crystal composites are easily reproduced in this modified synthetic method.

The resulting composition was then injected into a planar liquid crystal cell as described in Example 1. When the polarization of incident light is perpendicular to the liquid crystal director or an electric field is applied to the liquid crystal cell, the longitudinal SPR mode is excited thus the compositions show strong extinction in the vicinity of the longitudinal SPR peak of gold nanorods. When the polarization of incident light is parallel to the liquid crystal director while no electric field is applied, the transverse SPR mode is excited thus compositions show very weak extinction in the vicinity of the longitudinal SPR peak of gold nanorods.

Example 3

Nanoplatelets Aligned Parallel to Liquid Crystal Director

A surface modifier that directs gold nanorods to align in parallel to the liquid crystal director is applied to gold/silver nanoplatelets. 1 mL of an aqueous solution comprising 30 mg of thiol-terminated methoxy-poly(ethylene glycol) (mPEG-SH) was added to 50 mL of a diluted gold nanorod aqueous dispersion with optical density of 4. After standing for 24 hours the dispersion is centrifuged and the supernatant decanted to remove excess mPEG-SH. The surface capping procedure is repeated twice to fully coat nanoplatelets surfaces with mPEG. The surface modified gold nanorods were dispersed in methanol, centrifuged at 9000 rpm for 20 minutes, then washed with additional methanol three times. The solvent from 50 µL of gold/silver nanoplatelets dispersion was fully evaporated by heating to 90° C. 15 µL of a nematic 5CB was then added and the mixture sonicated at 40° C. for 5 minutes then cooled to room temperature with vigorous stirring. The resulting dispersion is centrifuged at 3000 rpm for 5 minutes to remove any residual aggregates. Multigram-scale preparation of gold/silver nanoplatelets-liquid crystal composites are easily reproduced in this modified synthetic method.

The resulting composition was then injected into a planar liquid crystal cell as described in Example 1. When no voltage is applied to the dispersion and the polarized light is applied parallel to the liquid crystal director N, the nanoplatelets show larger extinction. When electromagnetic radiation is applied with an electric bias, both parallel and perpendicular to the director or when applied perpendicular with no voltage, the resulting spectra are essentially coincidental on one another, showing smaller extinction.

Example 4

Nanoplatelets Aligned Perpendicular to Liquid Crystal Director

A surface modifier that directs gold/silver nanoplatelets to align perpendicular to the liquid crystal director is applied to gold/silver nanoplatelets. 0.3 µL of MPTMS was dissolved in 100 µL of ethanol and added to an 5 mL of aqueous solution of gold/silver nanoplatelets with an optical density of 0.4. After 20 minutes the solution is centrifuged and the supernatant decanted. The resulting solid re-dispersed in 10 mL distilled water. 200 µL of 40 wt % DMOAP in methanol is added and the solution allowed to stand for 20 minutes. The solution is then centrifuged at 7000 rpm for 10 minutes, the supernatant decanted and the residue washed with methanol. 15 µL of a nematic 5CB was then added and the solvent from gold/silver nanoplatelets dispersion in 5CB was fully evaporated by heating to 90° C. The mixture was sonicated at 40° C. for 5 minutes then cooled to room temperature with vigorous stirring. The resulting dispersion is centrifuged at 3000 rpm for 5 minutes to remove any residual aggregates. Multigram-scale preparation of gold/silver nanoplatelets-liquid crystal composites are easily reproduced in this modified synthetic method.

The resulting composition was then injected into a planar liquid crystal cell as described in Example 1. When the polarization of incident light is perpendicular to the liquid crystal director or an electric field is applied to the liquid crystal cell, the in-plane SPR mode is excited thus the compositions show strong absorption in the vicinity of the in-plane SPR peak of gold/silver nanoplatelets. When the polarization of incident light is parallel to the liquid crystal director while no electric field is applied, the out-of-plane SPR mode is excited thus compositions show very weak absorption in the vicinity of the in-plane SPR peak of gold/silver nanoplatelets.

Example 5

Co-Dispersion of Homeotropically Aligned Nanoplatelets and Tangentially Aligned Nanorods in Liquid Crystal mPEG-modified (tangentially aligned) gold nanorods and DMOAP-modified (homeotropically aligned) gold/silver nanoplatelets prepared according to the above examples were combined in methanol and co-dispersed in 5CB according to the procedures described above. The co-dispersion in 5CB was injected in planar liquid crystal cell described above. The following describes the optical properties of this admixture.

When the polarization of incident light is parallel to the liquid crystal director, the longitudinal SPR mode of tangentially aligned gold nanorods is excited thus the composition shows strong extinction only in the vicinity of the longitudinal SPR peak of gold nanorods. When the polarization of incident light is perpendicular the liquid crystal director, the in-plane SPR mode of homeotropically aligned gold/silver nanoplatelets is excited thus the composition shows strong extinction only in the vicinity of the in-plane SPR peak of gold/silver nanoplatelets, as shown in FIG. 8 (left).

In an electric field, however, only the in-plane SPR mode of homeotropically aligned gold/silver nanoplatelets is excited thus the composition shows strong extinction only in the vicinity of the in-plane SPR peak of gold/silver nanoplatelets. This property is independent of polarization of incident light, as shown in FIG. 8 (right).

This co-dispersion can be used in energy-saving smart windows. The in-plane SPR extinction peak of homeotropically aligned nanoplatelets is designed to be in infrared wavelength while the longitudinal SPR extinction peak of tangentially aligned nanorods is designed to be in visible light. The transmission of this co-dispersion in planar liquid crystal cell can be electrically switched between infrared and visible light, FIG. 8.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A composition comprising:
   a) functionalized anisotropic nanoparticles wherein the nanoparticles comprise a metal chosen from gold, silver, platinum, copper or zinc, wherein the functionalized anisotropic nanoparticles have at least two axes that are dissimilar; and
   b) liquid crystals,
   wherein the functionalized anisotropic nanoparticles comprise one or more organic compounds,
   wherein the functionalized anisotropic nanoparticles are dispersed within the liquid crystals,
   wherein the one or more organic compounds determine an orientation of the liquid crystals on the surfaces of functionalized anisotropic nanoparticles, and
   wherein the one or more organic compounds comprise (3-mercaptopropyl) trimethoxysilane and dimethyloctadecyl [3-(trimethoxysilyl) propyl] ammonium chloride.

2. The composition according to claim 1, wherein the liquid crystal is selected from the group consisting of: 1-(trans-4-hexylcyclohexyl)-4-isothiocyanatobenzene; 4'-(hexyloxy)-4-biphenylcarbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; and 4'-pentyl-4-biphenylcarbonitrile.

3. The composition according to claim 1, wherein the functionalized anisotropic nanoparticles have two or more sizes.

4. The composition according to claim 1, wherein the functionalized anisotropic nanoparticles have a length of from about 10 nm to about 1,000 nm.

5. The composition according to claim 1, wherein a portion of the nanoparticles are aligned homeotropically.

6. The composition according to claim 1, wherein the functionalized anisotropic nanoparticles comprise:
   i) a first nanoparticle and
   ii) a second nanoparticle,
   wherein the extinction spectrum of the first nanoparticle overlaps with the extinction spectrum of the second nanoparticle.

7. The composition according to claim 6, wherein the first nanoparticle is capable of rotating in an applied electric field.

8. The composition according to claim 6, wherein the second nanoparticle is capable of rotating in an applied electric field.

9. The composition according to claim 1, wherein at least one of the one or more organic compounds functionalize the functionalized anisotropic nanoparticles with a surface functionalizing agent to cause the liquid crystals to be aligned tangentially to the surface of functionalized anisotropic nanoparticles.

10. The composition according to claim 1, wherein the liquid crystal is chosen from 1-(trans-4-hexylcyclohexyl)-4-isothiocyanatobenzene; 4'-(hexyloxy)-4-biphenylcarbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile; 4,4'-azoxyanisole; 4-isothiocyanatophenyl 4-pentylbicyclo[2.2.2]octane-1-carboxylate; 4-(trans-4-pentylcyclohexyl)benzonitrile; 4-methoxycinnamic acid; N-(4-ethoxybenzylidene)-4-butylaniline; and N-(4-methoxybenzylidene)-4-butylaniline.

11. A composition comprising:
   a) functionalized anisotropic nanoparticles wherein the nanoparticles comprise a metal chosen from gold, silver, platinum, copper or zinc, wherein the functionalized anisotropic nanoparticles have at least two axes that are dissimilar; and
   b) liquid crystals,
   wherein the functionalized anisotropic nanoparticles comprise one or more organic compounds,
   wherein the functionalized anisotropic nanoparticles are dispersed within the liquid crystals,
   wherein the one or more organic compounds determine an orientation of the liquid crystals on the surfaces of functionalized anisotropic nanoparticles, and
   wherein at least one of the one or more organic compounds comprises thiol-terminated methoxy-poly(ethylene glycol).

12. The composition according to claim 11, wherein the liquid crystal is chosen from 1-(trans-4-hexylcyclohexyl)-4-isothiocyanatobenzene; 4'-(hexyloxy)-4-biphenylcarbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile; 4,4'-azoxyanisole; 4-isothiocyanatophenyl 4-pentylbicyclo[2.2.2]octane-1-carboxylate; 4-(trans-4-pentylcyclohexyl)benzonitrile; 4-methoxycinnamic acid; N-(4-ethoxybenzylidene)-4-butylaniline; and N-(4-methoxybenzylidene)-4-butylaniline.

13. The composition according to claim 11, wherein the liquid crystal is 4-cyano-4'-pentylbiphenyl.

14. The composition according to claim 11, wherein at least one of the one or more organic compounds functionalize the functionalized anisotropic nanoparticles with a surface functionalizing agent to cause the liquid crystals to be aligned tangentially to the surface of functionalized anisotropic nanoparticles.

15. The composition according to claim 11, wherein the functionalized anisotropic nanoparticles have a length of from about 10 nm to about 1,000 nm.

16. The composition according to claim 11, wherein a portion of the nanoparticles are aligned homeotropically.

* * * * *